United States Patent
Chen et al.

(10) Patent No.: US 8,457,468 B2
(45) Date of Patent: Jun. 4, 2013

(54) METHOD FOR EMBEDDING VIDEO ANNOTATION DATA INTO A CODED VIDEO STREAM AND VIDEO RECORDING DEVICE

(75) Inventors: Qu Qing Chen, Beijing (CN); Zhi Bo Chen, Beijing (CN); Xiao Dong Gu, Beijing (CN)

(73) Assignee: Thomson Licensing, Boulogne-Billancourt (FR)

(*) Notice: Subject to any disclaimer, the term of this patent is extended or adjusted under 35 U.S.C. 154(b) by 151 days.

(21) Appl. No.: 12/450,873

(22) PCT Filed: Apr. 20, 2007

(86) PCT No.: PCT/CN2007/001298
§ 371 (c)(1),
(2), (4) Date: Oct. 15, 2010

(87) PCT Pub. No.: WO2008/128381
PCT Pub. Date: Oct. 30, 2008

(65) Prior Publication Data
US 2011/0206356 A1    Aug. 25, 2011

(51) Int. Cl.
*H04N 9/80* (2006.01)
*H04N 5/92* (2006.01)

(52) U.S. Cl.
USPC .......................................... 386/239; 386/326

(58) Field of Classification Search
USPC ............... 386/239, 240, 241, 326, 328, 330, 386/332, 337, 353, 355
See application file for complete search history.

(56) References Cited

U.S. PATENT DOCUMENTS

| | | | |
|---|---|---|---|
| 2002/0049983 A1* | 4/2002 | Bove et al. | 725/135 |
| 2003/0140116 A1 | 7/2003 | Levi et al. | |
| 2003/0236912 A1 | 12/2003 | Klemets et al. | |
| 2007/0005789 A1 | 1/2007 | Wu | |
| 2008/0066129 A1* | 3/2008 | Katcher et al. | 725/109 |

OTHER PUBLICATIONS

Search Report Dated Aug. 20, 2007.
Chen et al SEI for functional app. ITU Study Group 16-video coding experts group-ISO/IEC MPEG & ITU-T VCEG (SO/IEC JTC1/SC29/WG11 and ITU-T SG16 Q6) XX, XX, No. JVT-U059, Oct. 26, 2006.
Chen et al. Video annotation SEI message, ITU Study Group, 16-Video Coding experts, group-ISO/IECE MPEG & ITU-T VCEG(ISO/IECE JTC1/SC29/WG11 and ITU-T SG16Q6 XX,XX No.JVT-V060, Jan. 18, 2007.
ISO IEC CD 13818-2 Information technology Generic coding of moving pictures and associated audio information Opart 2 video, International Standard-ISO, Zurich, CH. n. 659, Dec. 1, 1993.

\* cited by examiner

*Primary Examiner* — Robert Chevalier
(74) *Attorney, Agent, or Firm* — Robert D. Shedd; Jerome G. Schaefer

(57) ABSTRACT

The invention concerns a method for embedding video annotation data into a coded video stream. The method comprises the step of —encapsulating said video annotation data into a unit, so-called video annotation unit, of the coded video data stream which format corresponds to at least one format used for sending the associated video data, —inserting an identifiable synchronizing code enabling the identification of said video annotation unit into the video data stream.

9 Claims, 1 Drawing Sheet

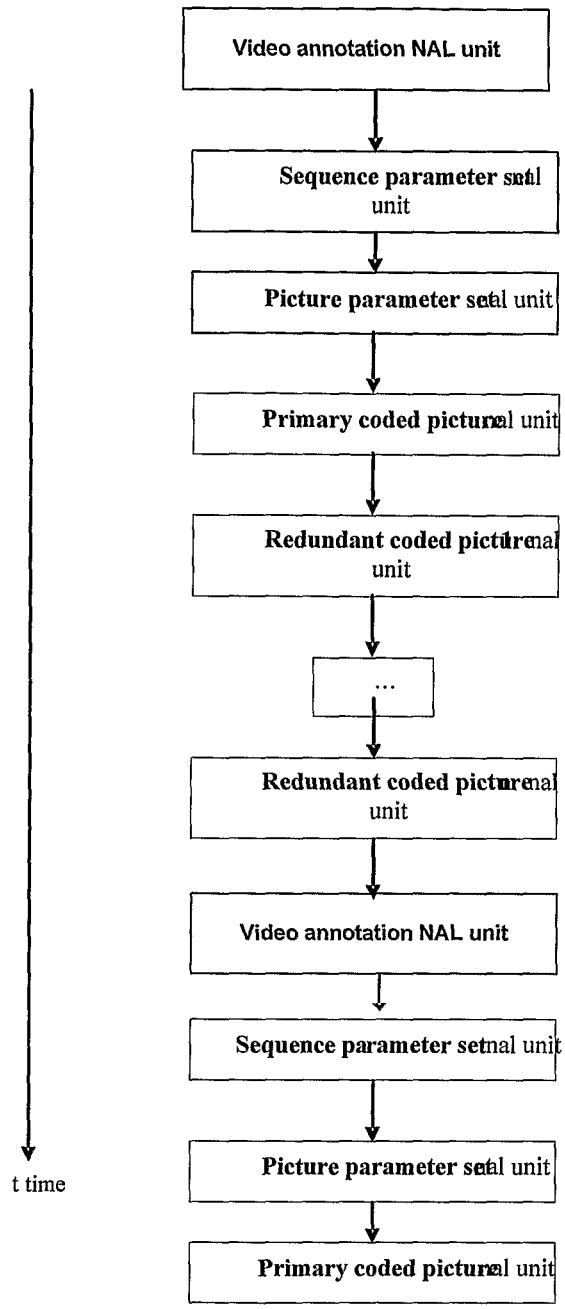

METHOD FOR EMBEDDING VIDEO ANNOTATION DATA INTO A CODED VIDEO STREAM AND VIDEO RECORDING DEVICE

This application claims the benefit, under 35 U.S.C. §365 of International Application PCT/CN2007/001298, filed Apr. 20, 2007, which was published in accordance with PCT Article 21(2) on Oct. 30, 2008 under international publication number WO2008/128381 in English.

FIELD OF THE INVENTION

The invention concerns a method and a device for embedding video annotation data into a coded video stream.

BACKGROUND OF THE INVENTION

Video indexing/retrieval has been more and more desirable due to the drastic increases of multimedia content. Content providers create huge amounts of video data everyday, and more and more personal videos or advertising media would also like to be shared in the Internet. How to manage the huge amounts of video content and search the most desirable video data is becoming much more important.

However, existing compressed video bit stream, e.g., H.261, H.263, MPEG-1, MPEG-2, MPEG-4, H.264, VC-1, can not support the function of fast video retrieval without decoding process. The decoding process usually needs entropy decoding, inverse quantization, inverse transform, and reconstruction, and therefore a lot of computational complexity is included during video search process.

On the other side, the existing video indexing/retrieval techniques, such as searching by text, and content based retrieval as studied by MPEG-7, all have some drawbacks. Text search by matching filenames, titles, or surrounding texts, can be very fast but frequently gives undesired results. MPEG-7 standard defines a variety of metadata which can support some degree of content based retrieval. However, MPEG-7 defines too many metadata so that it is too complex and too massive to be a real standard in practice. Meanwhile, MPEG-7 can not be used seamless with video coding schemes.

SUMMARY OF THE INVENTION

The invention proposes a method where the video annotation data are sent with the encoded data stream using units already defined in the encoding standard the data are encoded with.

To this end, the invention proposes a method for embedding video annotation data into a coded video stream. According to the invention, the method comprises the steps of
encapsulating said video annotation data into a unit, so-called video annotation unit, of the coded video data stream which format corresponds to at least one format used for sending the associated video data,
inserting an identifiable synchronizing code enabling the identification of said video annotation unit into the video data stream.

According to a preferred embodiment, said video annotation unit is a frame.

According to a preferred embodiment, said video annotation unit is a slice.

According to a preferred embodiment, said video data is compliant with ITU-T H.264 standard, said identifiable synchronizing code being defined in as a Network adaptation Layer unit type.

According to a preferred embodiment, said video data is compliant with MPEG-2 ISO/IEC-13818-2 standard, said unit format being a slice and said identifiable synchronizing code being a "slice_start_code" header.

According to a preferred embodiment, said video data is compliant with MPEG-2 ISO/IEC-13818-2 standard, said unit format being a frame and said identifiable synchronizing code being a "picture_start_code" header defined in MPEG-2 ISO/IEC-13818-2 standard.

According to a preferred embodiment, the method further comprises the steps of
measuring the entropy of said video data frames,
inserting said video annotation data into the data streams at time intervals depending on said measured entropy.

According to a preferred embodiment, the video annotation data comprise information chosen among:
color information,
texture information,
motion information,
textual semantic information,
fingerprint information,
or chosen among any combination of these information.

According to another aspect, the invention concerns a video recording device comprising the steps of
receiving a video encoded data stream,
decoding an identifiable synchronizing code identifying a video annotation unit
decoding only said data video annotation unit in said received video encoded data stream,
indexing said received video data stream according to said decoded video annotation unit.

BRIEF DESCRIPTION OF THE DRAWINGS

Other characteristics and advantages of the invention will appear through the description of a non-limiting embodiment of the invention, which will be illustrated, with the help of the enclosed drawing.

FIG. 1 represents a data stream comprising a Network Adaptation Layer dedicated to video annotation,

DETAILED DESCRIPTION OF A PREFERRED EMBODIMENT

On FIG. 1, a video data stream compliant with ITU-T H.264 standard is represented. This video data stream comprises a NAL unit defining video annotation data.

This NAL unit can be repeated any time in the data stream. It can correspond to the next frame or it can correspond to a plurality of frames, according to what is decided by the user or also according to the complexity of the video or other parameters.

In a preferred embodiment, the method comprises a step of measuring the complexity of the video frames. According to the entropy variation, a NAL unit related to video annotation can be inserted more often if there is a great entropy variation.

It can also be defined, in other embodiments, to insert a NAL unit related to video annotation at predefined time intervals, for instance each GOP.

In other embodiments, other criteria than the entropy variation can also be taken into account in order to decide how often a NAL unit related to video annotation can be inserted.

The following table 1 gives the different NAL unit type codes that are defined in the standard.

TABLE 1

| nal_unit_type | Content of NAL unit and RBSP syntax structure | C |
|---|---|---|
| 0 | Unspecified | |
| 1 | Coded slice of a non-IDR picture slice_layer_without_partitioning_rbsp( ) | 2, 3, 4 |
| 2 | Coded slice data partition A slice_data_partition_a_layer_rbsp( ) | 2 |
| . . . | . . . | . . . |
| 13 | Sequence parameter set extension seq_parameter_set_extension_rbsp( ) | 10 |
| 14 . . . 18 | Reserved | |
| 19 | Coded slice of an auxiliary coded picture without partitioning slice_layer_without_partitioning_rbsp( ) | 2, 3, 4 |
| 20 . . . 23 | Reserved | |
| 24 . . . 31 | Unspecified | |

In current embodiment the following code is used for the video NAL unit:

TABLE 2

| nal_unit_type | Content of NAL unit and RBSP syntax structure | C |
|---|---|---|
| 14 | Video annotation parameter set video_annotation_parameter_set_rbsp( ) | 5 |

In other embodiments, NAL unit type can be set to 15, 16 17 or 18 as these values are not yet used in the standard definition.

The content of the annotation metadata is not the purpose of this invention.

It can comprise low level features, such as color, motion, texture, etc, and high level features, such as text, and scene categories.

An example of such a NAL unit for video annotation is defined in the next table.

This NAL unit constitutes an identifiable synchronizing code which enables to detect the annotation data in the data stream. The synchronizing code is "14" in the given embodiment.

The video annotation metadata can also be defined as a new slice type. A "A" annotation slice is defined in order to make the distinction with the "I", "B" or "P", slices.

The video annotation metadata can also be defined as a new frame type. A "A" annotation frame is defined in order to make the distinction with the "I", "B" or "P", frames.

In a variant, still related to ITU-T H.264 standard, the video annotation metadata are encapsulated into a new parameter set, called "video_annotation_parameter_set".

Now, we are going to describe another embodiment of the invention. In this second embodiment of the invention, the video data stream is coded according to MPEG-2 standard ISO/IEC-13818-2.

In such a case, the synchronizing code is based on MPEG-2 startcodes as defined in the standard.

The following table gives the MPEG-2 defined start codes:

TABLE 3

| name | start code value (hexadecimal) |
|---|---|
| picture_start_code | 00 |
| slice_start_code | 01 through AF |
| reserved | B0 |
| reserved | B1 |
| user_data_start_code | B2 |

TABLE 3-continued

| name | start code value (hexadecimal) |
|---|---|
| sequence_header_code | B3 |
| sequence_error_code | B4 |
| extension_start_code | B5 |
| reserved | B6 |
| sequence_end_code | B7 |
| group_start_code | B8 |
| system start codes (see note) | B9 through FF |

Therefore, for a slice_start_code, several values comprised between 01 and AF are reserved. One of these values, not used for specifying already defined slice types, can identify a slice comprising video annotation.

The annotation data comprise metadata related to the motion, the texture, the colour, text metadata related to semantic information, and also metadata related to fingerprint. Metadata can also comprise compressed low resolution pictures forming annotation frames. The annotation frames enable the fast video browsing especially in mobile applications. The annotation frames can be searched and downloaded first by the clients to browse their interested video contents. If the customer enjoys those video annotation frames, then he can download the full video sequences.

The following table gives an example of video annotation data.

TABLE 4

| video_annotation_parameter_set_rbsp ( ) { | C | Descriptor |
|---|---|---|
| metadataType | 5 | u(8) |
| if (metadataType & 0x01 == 0x01) | | |
| text_metadata ( ) | 5 | |
| if (metadataType & 0x02 == 0x02) | | |
| motion_metadata ( ) | 5 | |
| if (metadataType & 0x80 == 0x04) | | |
| colour_metadata ( ) | 5 | |
| if (metadataType & 0x80 == 0x08) | | |
| texture_metadata (payloadSize) | 5 | |
| } | | |

Of course this is only an example and several other video annotation data can be implemented such as the annotation frames mentioned earlier.

We are now going to briefly talk about the decoding process.

At the decoder end, the video encoded data stream comprising the video annotation data, in any form described above, can be simply decoded as known data, if the decoder is aware of the different synchronizing codes used for specifying the video annotation metadata.

In the preferred embodiment of the invention, the decoder is embedded in a video recorder, such as for instance but not limited to, a personal video recorder (PVR). This personal video recorder can record several data streams received from any broadcaster, from the internet . . . . One interesting functionality for such kind of personal video recorder is the video indexing in order to enable the user to retrieve video data after having recorded them.

PVRs usually record video in a compressed manner in order to save place on the recording medium. Therefore, the patent application enables a fast video indexing of the data as the video data stream does not need to be decoded totally, only the units (NAL, slice, parameter sets.) which synchronization code is referenced as being related to video annotation are decoded for the video indexing process.

The invention claimed is:

1. Method for embedding video annotation data into a coded video stream, wherein it comprises the steps of
encapsulating said video annotation data into a unit, so-called video annotation unit, of the coded video data stream which format corresponds to at least one format used for sending the associated video data,
inserting an identifiable synchronizing code enabling the identification of said video annotation unit into the video data stream.

2. Method according to claim 1 wherein said video annotation unit is a frame.

3. Method according to claim 1 wherein said video annotation unit is a slice.

4. Method according to claim 1 wherein said video data is compliant with ITU-T H.264 standard, said identifiable synchronizing code being defined in as a Network adaptation Layer unit type.

5. Method according to claim 1 wherein said video data is compliant with MPEG-2 ISO/IEC-13818-2 standard, said unit format being a slice and said identifiable synchronizing code being a "slice_start_code" header.

6. Method according to claim 1 wherein said video data is compliant with MPEG-2 ISO/IEC-13818-2 standard, said unit format being a frame and said identifiable synchronizing code being a "picture_start_code" header defined in MPEG-2 ISO/IEC-13818-2 standard.

7. Method according to claim 1 wherein it further comprises the steps of
measuring the entropy of said video data frames,
inserting said video annotation data into the data streams at time intervals depending on said measured entropy.

8. Method according to claim 1 wherein the video annotation data comprise information chosen among:
color information,
texture information,
motion information,
textual semantic information,
fingerprint information,
or chosen among any combination of these information.

9. Video recording device wherein it comprises the steps of
receiving a video encoded data stream,
decoding an identifiable synchronizing code identifying a video annotation unit
decoding only said data video annotation unit in said received video encoded data stream,
indexing said received video data stream according to said decoded video annotation unit.

* * * * *